W. E. FERRIS.
AUTOMOBILE TRAILER COUPLING.
APPLICATION FILED APR. 30, 1919.
1,437,836.
Patented Dec. 5, 1922.
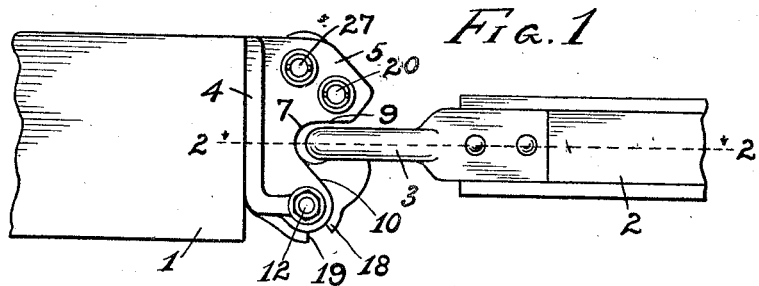
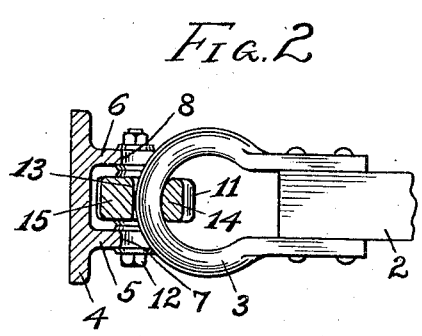
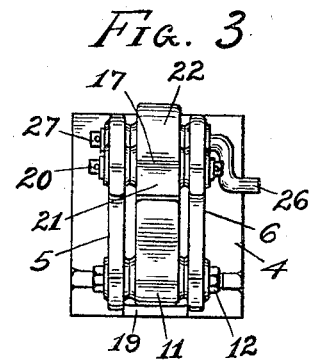
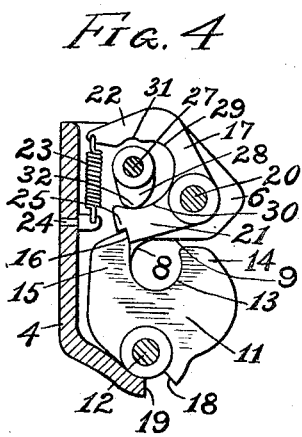
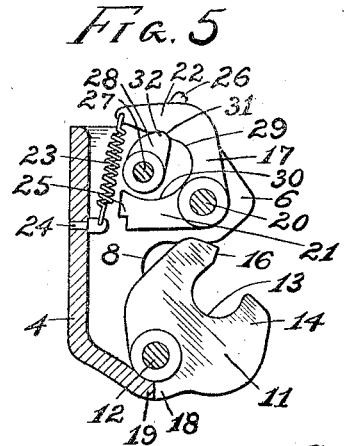
Inventor
W. E. Ferris
By [signature],
his Attorney Patented Dec. 5, 1922.

1,437,836

UNITED STATES PATENT OFFICE.

WILLIAM E. FERRIS, OF CLEVELAND, OHIO, ASSIGNOR TO THE OHIO TRAILER COMPANY, A CORPORATION OF OHIO.

AUTOMOBILE TRAILER COUPLING.

Application filed April 30, 1919. Serial No. 293,840.

*To all whom it may concern:*

Be it known that I, WILLIAM E. FERRIS, a citizen of the United States, residing at Cleveland, in the county of Cuyahoga and State of Ohio, have invented certain new and useful Improvements in Automobile Trailer Couplings, of which the following is a specification.

This invention relates to devices for coupling trailers to motor vehicles or one trailer to another, and has for its main object to provide a coupling of simple construction, which will close and be locked automatically by the motor vehicle backing up to the trailer.

Another object of the invention is to provide a coupling which is easily operated for opening it and leaving it set for said coupling action.

With the above and other objects in view as will be readily understood, the invention will be hereinafter fully described, reference being had to the accompanying drawings, which are only intended to illustrate the invention, and the novel features thereof will be distinctly pointed out in the appended claims.

Similar characters of reference are used to indicate corresponding parts in the several views of the drawings.

Figure 1 is a side elevation illustrating a trailer coupled to a motor vehicle by a device constructed in accordance with my invention, Fig. 2 is a sectional plan view of the coupling taken on line 2—2 of Fig. 1, Fig. 3 is a front view of the coupling, Fig. 4 is a sectional elevation of the coupling in closed position, and Fig. 5 is a similar view of the coupling in open or set position.

Referring to the drawings, 1 represents a motor vehicle to which is to be coupled a trailer having a draw-bar 2 terminating in an eye 3. To the rear end of the motor vehicle 1 is fixed a bracket 4 having side plates 5 and 6, which are provided with corresponding curved recesses 7 and 8 cut therein from the outer rear edges thereof for receiving the eye 3 of the draw-bar. From said curved recesses extend straight horizontal sides 9 and inclined sides 10. A hook 11 is arranged between the side plates 5 and 6 and is pivoted to their lower corners by means of a bolt 12. Said hook is provided with a curved recess 13 corresponding to the curved recesses 7 and 8, and its outer end 14 is adapted to enter the eye 3 of the drawbar, while its inner end 15 is somewhat longer and its face 16 is adapted to be engaged by a latch 17 for locking the hook in its closed position. For limiting the opening movement of the hook 11, the same is provided with a shoulder 18 for engaging a stop 19 carried by the bracket 4.

The latch 17 is pivoted at 20 between the side plates 5 and 6, and consists of a lower arm 21 for engaging the end 15 of the hook 11, and an upper arm 22, to which is attached a coiled spring 23 having its other end connected to the bracket 4 at 24, tending to keep the latch in its locked position. A shoulder 25 of the lower arm 21 of the latch, is adapted to engage the longer end 15 of the hook 11 to prevent the latch from moving beyond a certain point with relation to said end of the hook. For the purpose of disengaging the latch from the hook to allow it to fall to its open position and also for holding the latch in its locked position, a handle 26 is rotatably mounted in the side plates 5 and 6 at 27, and fixed to said handle between said side plates is a cam 28 for engaging the curved inner edges 29 and 30 of the arms of the latch. When the handle 26 is operated to cause the cam 28 to engage the curved edge 29 of the latch, as shown in Fig. 5, the lower arm 21 thereof is thrown out of engagement with the end 15 of the hook and the hook falls to its open position. When said cam engages the curved edge 30 of the latch, as in Fig. 4, the hook is locked in its closed position. In order to be able to set the cam 28 for holding the latch 17 in its upper position, the edge 29 of the upper arm 22 of the latch is provided with a transverse depression 31, which is adapted to be engaged by the nose 32 of the cam, as shown in Fig. 5.

In operation, the handle 26 is rotated to cause the cam 28 to engage the curved edge 29 of the latch arm 22, thereby throwing the other arm 21 clear of the end 15 of the hook 11, thus allowing the hook to fall until its shoulder 18 engages the stop 19, which is its fully open position. Further rotating of the handle will cause the nose 32 of the cam to enter the transverse depression 31 of the latch arm 22 thereby holding the latch in a set or unlocking position. By backing the motor vehicle in such a manner that the eye 3 of the draw-bar of the trailer will strike the longer end 15 of the hook 11, the hook will be thrown upwardly, and its end 14 will enter said eye. At the same time, said longer end of the hook engages the lower arm 21 of the latch, thereby tilting it upwardly and causing the depression 31 to release the cam 28, which allows said lower arm of the latch to fall back of the face 16 of the longer end of the hook and thus hold the hook in locked position. When the cam is released, it tends to rotate clockwise, due to the over-balance of the cam itself, the handle 26, and the pull of the spring 23, until its nose 32 engages the curved edge 30 of the lower arm of the latch, as in Fig. 4, thus locking the latch against movement.

Having fully described my invention, what I claim is:

1. In a vehicle coupling, the combination of a pivotally supported hook, a pivoted latch for locking the hook in its closed position, and a cam adapted to engage the latch for holding the latch in locking position and moving the latch out of locking position, substantially as described.

2. In a vehicle coupling, the combination of a pivotally supported hook, a pivoted latch for locking the hook in its closed position, the latch being provided with a lower arm and an upper arm, and a cam adapted to engage said arms for holding the latch in locking position and moving the latch out of locking position, substantially as described.

3. In a vehicle coupling, the combination of a pivotally supported hook, a pivoted latch, the latch having a lower arm adapted to lock the hook in its closed position and an upper arm, and a cam operative between said arms adapted to engage the lower arm for holding the latch in locking position and the upper arm for moving the latch out of locking position, substantially as described.

4. In a vehicle coupling, the combination of a pivotally supported hook, a pivoted latch, the latch having a lower arm adapted to lock the hook in its closed position and an upper arm, means tending to force the latch into locking action, and a cam operative between said arms adapted to engage the lower arm for holding the latch in locking position and the upper arm for moving the latch out of locking position, substantially as described.

5. In a vehicle coupling, the combination of a pivotally supported hook, a pivoted latch for locking the hook in its closed position, means for holding the latch in locking position and moving the latch out of locking position, the latch being provided with a lower arm and an upper arm, and the upper arm of the latch being provided with a recess for receiving the cam to hold the latch in a set position, substantially as described.

6. In a vehicle coupling, the combination of a pivotally supported hook, the hook having a short end and a long end, a latch, the latch being adapted to engage the long end of the hook for holding the hook in closed position, a spring tending to force the latch into locking action, and a cam adapted to engage the latch for moving the latch out of locking position and for holding it in locking position, substantially as described.

In testimony whereof I affix my signature.

WILLIAM E. FERRIS.